(12) United States Patent
Bell et al.

(10) Patent No.: US 7,810,028 B2
(45) Date of Patent: Oct. 5, 2010

(54) METHOD AND SYSTEM FOR COPYING, MOVING, REPLACING AND DELETING CONTENT IN GROUP-EDITABLE ELECTRONIC DOCUMENTS

(75) Inventors: David G. Bell, Menlo Park, CA (US); Eric A. Bier, Mountain View, CA (US); Bay-Wei Chang, Foster City, CA (US); Kenneth A. Pier, Mountain View, CA (US)

(73) Assignee: Xerox Corporation, Norwalk, CT (US)

( * ) Notice: Subject to any disclaimer, the term of this patent is extended or adjusted under 35 U.S.C. 154(b) by 87 days.

(21) Appl. No.: 10/744,022

(22) Filed: Dec. 23, 2003

(65) Prior Publication Data

US 2005/0138554 A1    Jun. 23, 2005

(51) Int. Cl.
G06F 17/24 (2006.01)
(52) U.S. Cl. .................. 715/256; 715/255; 715/271
(58) Field of Classification Search .............. 715/530, 715/255, 256, 271; 707/103
See application file for complete search history.

(56) References Cited

U.S. PATENT DOCUMENTS

| | | | | |
|---|---|---|---|---|
| 5,706,452 A * | 1/1998 | Ivanov | ........................ | 715/751 |
| 5,734,837 A * | 3/1998 | Flores et al. | .................... | 705/7 |
| 5,966,512 A * | 10/1999 | Bates et al. | ................. | 709/205 |
| 5,995,097 A * | 11/1999 | Tokumine et al. | ........... | 715/752 |
| 6,088,702 A * | 7/2000 | Plantz et al. | ............ | 707/103 R |
| 6,791,582 B2 * | 9/2004 | Linsey et al. | ................ | 715/751 |
| 6,996,780 B2 * | 2/2006 | Estrada | ........................ | 715/751 |
| 7,272,820 B2 * | 9/2007 | Klianev | ....................... | 717/109 |
| 2002/0073125 A1 * | 6/2002 | Bier | ........................... | 707/530 |
| 2004/0088653 A1 * | 5/2004 | Bell et al. | .................... | 715/530 |
| 2004/0133848 A1 * | 7/2004 | Hunt et al. | ................... | 715/500 |
| 2004/0205644 A1 * | 10/2004 | Shaughnessy et al. | ........ | 715/530 |
| 2004/0261023 A1 * | 12/2004 | Bier | ........................... | 715/530 |
| 2005/0154993 A1 * | 7/2005 | Chen et al. | .................. | 715/770 |

OTHER PUBLICATIONS

"Sparrow Web—community shared web pages" (hereinafter, "Sparrow"), published at http:sparrow10.parc.xerox.com: 8000/sparrow_2.0/index.html (© 2001).*

"The Complete Idiot's Guide to Microsoft Word 2000" by Daniel T. Bobola, published by Alpha Books in 1999, pp. i, ii, 34, 37, 87, 88.*

U.S. Appl. No. 10/289,531, System and Method for Copying Formatting Information Between Web Pages, filed Nov. 5, 2002, by David G. Bell, et al.

Zenographics, "PostScript Interpreter" 2001 [Retrieved from the Internet at www.zeno.com/Technology/Windows_Host_Raster_Printing/PostScript.asp on Oct. 31, 2002].

(Continued)

Primary Examiner—Doug Hutton
Assistant Examiner—Gregory A Distefano

(57) ABSTRACT

A system and methods for copying, deleting, replacing, and moving content in group-editable web pages is disclosed. The system includes a server and devices, such as computers, which can communicate via a network. Users at the computers can access group-editable web pages from the server and request that content operations be performed involving content in a first page and optionally one or more second pages. The server obtains content operation details needed to perform the content operation by finding content operation implementation information in the first page itself and/or in another page.

39 Claims, 16 Drawing Sheets

OTHER PUBLICATIONS

Chang B., "In-Place Editing of Web Pages: Sparrow Community-Shared Documents," Xerox Palo Alto Research Center, 3333 Coyote Hill Road, Palo Alto, CA 94303, U.S.A. (1998) [Retrieved from the Internet at http://www2.prc.com/ist1/projects/sparrow/doc/www7 on Oct. 29, 2002].

Bier, E. et al., Sparrow Web: Group-Writable Web Pages and Their Applications, For Presentation at the Standford Seminar On People, Computers, and Design on Mar. 15, 2002 PARC (2002).

* cited by examiner

San Francisco Bay Area Office

Sales and service to the Bay Area. List active customer accounts and schedule billing on this page.

Active Customers
Customers who are actively buying our services.

| Company | Contact | Phone | Copy |
|---|---|---|---|
| 42(1)( Acme Widgets | John Doe (Founder) | 650.123.4567 | 43(1) |
| 42(2)( Beta Ball Bearings | Barbara Beta | 415-234-5678 | 43(2) |
| 42(3)( Cameo Curtains | Carol Chan | 408-345-6789 | 43(3) |

Customers Who Need to Be Billed
Customers who owe money and have not been billed yet in this billing cycle.

| Company | Contact | Phone | Copy |
|---|---|---|---|
| 44(1)( Beta Ball Bearings | Barbara Beta | 415-234-5678 | 45(1) |

123 Fourth St., Fifth City, CA 94304

[copy to regional page] 46  [copy to all pages] 48
[copy entire page] 50

*FIG. 5*

```
                                                            ┌─ 41(1)
┌─────────────────────────────────────────────────────────┐/
│ <html><head>                                            │
│ <META HTTP-EQUIV="pragma" CONTENT="no-cache">         ┐ │
│ :                                                      │ │
│ <!--Normal HTML Header Mark-up-->                      ├─52
│ :                                                      │ │
│ <BASE HREF="http://penguin.parc.xerox.com:8080/sparrow/"> │
│ <title>San Francisco Bay Area Office</title>          ┘ │
│                                                         │
│ <!-- SparrowTemplate: Customers                         │
│ <SPARROW buttons="" notify="" addnotify="" notifyreplyto=""> ┐
│ <--                                                      │
│ <tr>                                                     │
│ <td valign="top">                                        │
│ <b><field type="text" name="Company" label="Company Name" size="50"></B></td>
│ <td valign=top>                                          ├─54
│ <field type=mailto size=40 name="Contact"></td>          │
│ <td valign=top>                                          │
│ <b><field type=text size=15 name="Phone" label="Contact Phone"></b></td>
│ <td valign=top><input type="image" name="SparrowWorkflow-0-3" src="img/archive.gif">
│ <field type="textarea" name="Address" rows="3" cols="80" format="<hide %s>"></td>
│ </tr>                                                    │
│ -->                                              ╲55    ┘
│                                                         │
│ <!-- SparrowTemplate: Billable }80                      │
│ <SPARROW buttons="" notify="" addnotify="" notifyreplyto=""> ┐
│ <--                                                      │
│ <tr>                                                     │
│ <td valign="top">                                        │
│ <b><field type="text" name="Company" label="Company Name" size="50"></B></td>
│ <td valign=top>                                          │
│ <field type=mailto size=40 name="Contact"></td>          │
│ <td valign=top>                                          ├─56
│ <field type=text size=15 name="Phone" label="Contact Phone"></td>
│ <td valign=top><input type="image" name="SparrowWorkflow-0-5" src="img/archive.gif"></td>
│ </tr>                                                    │
│ <tr>                                                     │
│ <td> </td><td> </td>      ╲57                 │
│ <td colspan="2">                                         │
│ <b><field type="textarea" name="Address" rows="3" cols="80"></b></td>
│ </tr>                                                    │
│ -->                                                     ┘
│                                                         │
│ </head><body>                                           │
│ :                                                       │
└─────────────────────────────────────────────────────────┘
```

FIG. 6A

```
<FORM ACTION="http://penguin.parc.xerox.com:8080/sparrow/servlet/sparrow#sparrow"
ENCTYPE="multipart/form-data" METHOD="POST">

<input type="hidden" name="SparrowWorkflowInfo-3-OPERATION_IDENTIFIER"
value="Copy">
<input type="hidden" name="SparrowWorkflowInfo-3-DESTINATION_IDENTIFIER1"
value="THISPAGE">
<input type="hidden" name="SparrowWorkflowInfo-3-LOCATION_IDENTIFIER1"
value="1100">
<input type="hidden" name="SparrowWorkflowInfo-3-POSITION_IDENTIFIER1"
value="after">

<input type="hidden" name="SparrowWorkflowInfo-5-OPERATION_IDENTIFIER"
value="Copy">
<input type="hidden" name="SparrowWorkflowInfo-5-CONTENT_TYPE_IDENTIFIER"
value="Customers">
<input type="hidden" name="SparrowWorkflowInfo-5-DESTINATION_IDENTIFIER1"
value="flexibleproject_calif.html">
<input type="hidden" name="SparrowWorkflowInfo-5-LOCATION_IDENTIFIER1"
value="1072">
<input type="hidden" name="SparrowWorkflowInfo-5-POSITION_IDENTIFIER1"
value="before">

<input type="hidden" name="SparrowWorkflowInfo-6-OPERATION_IDENTIFIER"
value="Copy">
<input type="hidden" name="SparrowWorkflowInfo-6-CONTENT_TYPE_IDENTIFIER"
value="Billable">
<input type="hidden" name="SparrowWorkflowInfo-6-DESTINATION_IDENTIFIER1"
value="flexibleproject_calif.html">
<input type="hidden" name="SparrowWorkflowInfo-6-LOCATION_IDENTIFIER1"
value="1072">
<input type="hidden" name="SparrowWorkflowInfo-6-POSITION_IDENTIFIER1"
value="before">
<input type="hidden" name="SparrowWorkflowInfo-6-DESTINATION_IDENTIFIER2"
value="flexibleproject_co.html">
<input type="hidden" name="SparrowWorkflowInfo-6-LOCATION_IDENTIFIER2"
value="1072">
<input type="hidden" name="SparrowWorkflowInfo-6-POSITION_IDENTIFIER2"
value="before">

<input type="hidden" name="SparrowWorkflowInfo-10-OPERATION_IDENTIFIER"
value="Copy">
<input type="hidden" name="SparrowWorkflowInfo-10-DESTINATION_IDENTIFIER"
value="copy_destination_page.html">
<input type="hidden" name="SparrowWorkflowInfo-10-
OVERWRITE_ALLOWED_IDENTIFIER" value="True">
```

FIG. 6B

```
<font class="SectionTitle"><b>
<font color=black>
Active Customers</font></b></font>
<br><font class="Small">Customers who are actively buying our services.</font>
<blockquote>
<table width=90% border=0 class=BorderTable2 cellspacing=0 cellpadding=3>
<tr>
<td bgcolor="#E0E0E0">Company</td>
<td bgcolor="#E0E0E0">Contact </td>
<td bgcolor="#E0E0E0">Phone</td>
<td bgcolor="#E0E0E0">Copy</td></tr>

<!--Item-Customers-1072-->
<tr>
<td valign="top">
<b><!--+-->Acme Widgets<!--/--></B></td>
<td valign=top>
<!--+--><A HREF="mailto:doe@c1.com">John Doe (Founder)</A><!--/--></td>
<td valign=top>
<b><!--+-->650.123.4567<!--/--></b></td>
<td valign=top><input type="image" name="SparrowWorkflow-1072-3"
src="img/archive.gif"><!--+--><hide 111 Acme Street, Akron OH 01572><!--/--></td>
</tr>
<!--//-->

<!--Item-Customers-1101-->
<tr>
<td valign="top">
<b><!--+-->Beta Ball Bearings<!--/--></B></td>
<td valign=top>
<!--+--><A HREF="mailto:beta@bbbearings.com">Barbara Beta</A> <!--/--></td>
<td valign=top>
<b><!--+-->415-234-5678<!--/--></b></td>
<td valign=top><input type="image" name="SparrowWorkflow-1101-3"
src="img/archive.gif"><!--+--><hide 123 Fourth St., Fifth City, CA 94304><!--/--></td>
</tr>
<!--//-->

<!--Item-Customers-1102-->
<tr>
<td valign="top">
<b><!--+-->Cameo Curtains<!--/--></B></td>
<td valign=top>
<!--+--><A HREF="mailto:chan@cameocurtain.com">Carol Chan</A> <!--/--></td>
<td valign=top>
<b><!--+-->408-345-6789<!--/--></b></td>
<td valign=top><input type="image" name="SparrowWorkflow-1102-3"
src="img/archive.gif"><!--+--><hide 333 Cameo Court, Courtney CA 94124><!--/--></td>
</tr>
<!--//-->

</table></blockquote>
```

FIG. 6C

```
<font class="SectionTitle"><b>
<font color=black>
Customers Who Need to Be Billed</font>
</b></font>
<br>
<font class="Small">Customers who owe money and have not been billed yet in this billing
cycle.</font>
<blockquote><table width=90% border=0 class=BorderTable2 cellspacing=0
cellpadding=3>
<td bgcolor="#E0E0E0">Company</td>
<td bgcolor="#E0E0E0">Contact </td>
<td bgcolor="#E0E0E0">Phone</td>
<td bgcolor="#E0E0E0">Copy</td></tr>

<!--Item-Billable-1100-->
<tr>
<td valign="top">
<b><!--+-->Beta Ball Bearings<!--/--></B></td>
<td valign=top>
<!--+--><A HREF="mailto:beta@bbbearings.com">Barbara Beta</A> <!--/--></td>
<td valign=top>
<!--+-->415-234-5678<!--/--></td>
<td valign=top><input type="image" name="SparrowWorkflow-1100-5"
src="img/archive.gif"></td>
</tr>
<tr>
<td> </td><td> </td>
<td colspan="2">
<b><!--+-->123 Fourth St., Fifth City, CA 94304<!--/--></b></td>
</tr>
<!--//-->

</table></blockquote>
<center>
<input type="submit" name="SparrowWorkflow-5" value="copy to regional page">
<input type="submit" name="SparrowWorkflow-6" value="copy to all pages"><br>

<input type="submit" name="SparrowWorkflow-10" value="copy entire page">
</center>

</form></body></html>
```

FIG. 6D

```
<font class="SectionTitle"><b>
<font color=black>
Customers Who Need to Be Billed</font>
</b></font>
<br>
<font class="Small">Customers who owe money and have not been billed yet in this billing cycle.</font>
<blockquote><table width=90% border=0 class=BorderTable2 cellspacing=0 cellpadding=3>
<td bgcolor="#E0E0E0">Company</td>
<td bgcolor="#E0E0E0">Contact </td>
<td bgcolor="#E0E0E0">Phone</td>
<td bgcolor="#E0E0E0">Copy</td></tr>

<!--Item-Billable-1100-->
<tr>
<td valign="top">
<b><!--+-->Beta Ball Bearings<!--/--></B></td>
<td valign=top>
<!--+--><A HREF="mailto:beta@bbbearings.com">Barbara Beta</A><!--/--></td>
<td valign=top>
<!--+-->415-234-5678<!--/--></td>
<td valign=top><input type="image" name="SparrowWorkflow-1100-5" src="img/archive.gif"></td>
</tr>
<tr>
<td> </td><td> </td>
<td colspan="2">
<b><!--+-->123 Fourth St., Fifth City, CA 94304<!--/--></b></td>
</tr>
<!--//-->

<!--Item-Billable-1103-->
<tr>
<td valign="top"><A NAME="sparrow"></A>
<b><!--+-->Cameo Curtains<!--/--></B></td>
<td valign=top>
<!--+--><A HREF="mailto:chan@cameocurtain.com">Carol Chan</A> <!--/--></td>
<td valign=top>
<!--+-->408-345-6789<!--/--></td>
<td valign=top><input type="image" name="SparrowWorkflow-1103-5" src="img/archive.gif"></td>
</tr>
<tr>
<td> </td><td> </td>
<td colspan="2">
<b><!--+-->333 Cameo Court, Courtney CA 94124<!--/--></b></td>
</tr>
<!--//-->

</table></blockquote>

<center>
<input type="submit" name="SparrowWorkflow-5" value="copy to regional page">

<input type="submit" name="SparrowWorkflow-6" value="copy to all pages"><br>

<input type="submit" name="SparrowWorkflow-10" value="copy entire page">
</center>

</form></body></html>
```

FIG. 7

San Francisco Bay Area Office

Sales and service to the Bay Area. List active customer accounts and schedule billing on this page.

Active Customers
Customers who are actively buying our services.

| Company | Contact | Phone | Copy |
|---|---|---|---|
| 42(1) Acme Widgets | John Doe (Founder) | 650.123.4567 | 43(1) |
| 42(2) Beta Ball Bearings | Barbara Beta | 415-234-5678 | 43(2) |
| 42(3) Cameo Curtains | Carol Chan | 408-345-6789 | 43(3) |

Customers Who Need to Be Billed
Customers who owe money and have not been billed yet in this billing cycle.

| Company | Contact | Phone | Copy |
|---|---|---|---|
| 44(1) Beta Ball Bearings | Barbara Beta | 415-234-5678; 123 Fourth St., Fifth City, CA 94304 | 45(1) |
| 44(2) Cameo Curtains | Carol Chan | 408-345-6789; 333 Cameo Court, Courtney CA 94124 | 45(2) |

[copy to regional page] 46  [copy to all pages] 48
[copy entire page] 50

West Coast Region

West Coast Region

Sales and service throughout the West Coast region. List active customer accounts and schedule billing on this page.

Active Customers
Customers who are actively buying our services.

| Company | Contact | Phone | Copy |
|---|---|---|---|
| Damon Diamonds | Dale Dickson | 617-123-4567 | 📄 |

```
                                                                    ┌─ 91(1)
<html><head><META HTTP-EQUIV="pragma" CONTENT="no-cache">
:
<title> West Coast Region</title>
:
</head> <body>
:
<FORM ACTION="http://penguin.parc.xerox.com: 8080/sparrow/servlet/sparrow#sparrow"
ENCTYPE="multipart/form-data" METHOD="POST">

<input type="hidden" name="SparrowWorkflowInfo-7-OPERATION_IDENTIFIER" value="Copy">
<input type="hidden" name="SparrowWorkflowInfo-7-CONTENT_TYPE_IDENTIFIER"
value="Customers">
<input type="hidden" name="SparrowWorkflowInfo-7-DESTLNATION_IDENTIFIER1"
value="flexibleproject_co.html">
<input type="hidden" name="SparrowWorkflowInfo-7-LOCATION_IDENTIFIER 1" value="1072">
<input type="hidden" name="SparrowWorkflowInfo-7-POSITION_IDENTIFIER1" value="before">
:
<!--+-->Active Customers<!--/--></font>
</b></font>
<!--+--><!--/-->
<br>
<font class="Small"><!--+-->Customers who are actively buying our services.<!--/--></font>
<!--//--><blockquote>
<table width=90% border=0 class=BorderTable2 cellspacing=0 cellpadding=3>
<tr>
<td bgcolor="#E0E0E0"> </td>
<td bgcolor="#E0E0E0">Company</td>
<td bgcolor="#E0E0E0">Contact</td>
<td bgcolor="#E0E0E0">Phone</td>
<td bgcolor="#E0E0E0">Copy</td>
</tr>

<!--Item-Customers-1072-->
<tr>
<td valign=top>

<b><font size="-2"><!--+-->Damon Diamonds<!--/--></font></b>
</td>
<td valign=top>
<font size="-2"><!--+--><A HREF="mailto:dickson@damondiamonds.com">Dale Dickson</A><!--/--
></font>
<td>
<td valign=top>
<b><font size="-2"><!--+-->617-123-4567<!--/--></font></b>
</td>
<td valign=top><input type="image" name="SparrowWorkflow-1072-7" src="img/archive.gif">
</td>
</tr>
<!--//-->
:
</td></tr></table></form></body></html>
```
⎫
⎬ 94(1)
⎭

FIG. 10

```
<!--+-->Active Customers<!--/--></font>
</b></font>
<!--+--><!--/-->
<br>
<font class="Small"><!--+-->Customers who are actively buying our services.<!--/--></font>
<!--//--><blockquote>
<table width=90% border=0 class=BorderTable2 cellspacing=0 cellpadding=3>
<tr>
<td bgcolor="#E0E0E0"> </td>
<td bgcolor="#E0E0E0">Company</td>
<td bgcolor="#E0E0E0">Contact</td>
<td bgcolor="#E0E0E0">Phone</td>
<td bgcolor="#E0E0E0">Copy</td>
</tr>

<!--Item-Customers-1101-->
<tr>
<td valign=top>

<b><font size="-2"><!--+-->Acme Widgets<!--/--></font></b>
</td>
<td valign=top>
<font size="-2"><!--+--><A HREF="mailto:doe@c1.com">John Doe (Founder)</A><!--/--></font>
<td>
<td valign=top>
<b><font size="-2"><!--+-->650.123.4567<!--/--></font></b>
</td>
<td valign=top><input type="image" name="SparrowWorkflow-1101-7" src="img/archive.gif">
</td>
</tr>
<!--//-->

<!--Item-Customers-1102-->
<tr>
<td valign=top>

<b><font size="-2"><!--+-->Beta Ball-Bearings<!--/--></font></b>
</td>
<td valign=top>
<font size="-2"><!--+--><A HREF="mailto:beta@bbbearings.com">Barbara Beta</A><!--/--></font>
<td>
<td valign=top>
<b><font size="-2"><!--+-->415-234-5678<!--/--></font></b>
</td>
<td valign=top><input type="image" name="SparrowWorkflow-1102-7" src="img/archive.gif">
</td>
</tr>
<!--//-->
```

FIG. 11A

```
<!--Item-Customers-1103-->
<tr>
<td valign=top>
<b><font size="-2"><!--+-->Cameo Curtains<!--/--></font></b>
</td>
<td valign=top>
<font size="-2"><!--+--><A HREF="mailto:chan@cameocurtain.com">Carol Chan</A><!--/--></font>
<td>
<td valign=top>
<b><font size="-2"><!--+-->408-345-6789<!--/--></font></b>
</td>
<td valign=top><input type="image" name="SparrowWorkflow-1103-7" src="img/archive.gif">
</td>
</tr>
<!--//-->

<!--Item-Customers-1072-->
<tr>
<td valign=top>
<b><font size="-2"><!--+-->Damon Diamonds<!--/--></font></b>
</td>
<td valign=top>
<font size="-2"><!--+--><A HREF="mailto:dickson@damondiamonds.com">Dale Dickson</A><!--/--
></font>
<td>
<td valign=top>
<b><font size="-2"><!--+-->617-123-4567<!--/--></font></b>
</td>
<td valign=top><input type="image" name="SparrowWorkflow-1072-7" src="img/archive.gif">
</td>
</tr>
<!--//-->
```

West Coast Region

West Coast Region

Sales and service throughout the West Coast region. List active customer accounts and schedule billing on this page.

Active Customers
Customers who are actively buying our services.

| Company | Contact | Phone | Copy |
|---|---|---|---|
| 92(2){ Acme Widget | John Doe (Founder) | 650.123.4567 | 📋 93(2) |
| 92(3){ Beta Ball-Bearings | Barbara Beta | 415-234-5678 | 📋 93(3) |
| 92(4){ Cameo Curtains | Carol Chan | 408-345-6789 | 📋 93(4) |
| 92(1){ Damon Diamonds | Dale Dickson | 617-123-4567 | 📋 93(1) |

*FIG. 12*

Workflow Information Document — 100

| rule_id | source_id | content_type_id | destination_id | workflow_operation_id | location_id | position_id |
|---|---|---|---|---|---|---|
| 1 | source_page.html | customer | This Page | Copy | 1100 | after |
| 2 | source_page.html | customer | flexibleproject_calif.html | Copy | 1072 | before |

Add an item — 106

*FIG. 13*

METHOD AND SYSTEM FOR COPYING, MOVING, REPLACING AND DELETING CONTENT IN GROUP-EDITABLE ELECTRONIC DOCUMENTS

FIELD

This invention relates generally to manipulating content within electronic documents and, more particularly, to a method and system for copying, moving, replacing and/or deleting content within group-editable electronic documents using content operation details stored directly in the source code embodying the group-editable documents.

BACKGROUND

Network environments enable making large quantities of information available to network members using a viewer application, such as a web browser, for example. Typically, there is a one-way transfer of information from a web page to a group of web page readers. Modifying the information in a web page requires that a web page author edit the content which defines aspects of the web page, such as hypertext markup language ("HTML"). Several systems are available for modifying web page content. Some of these systems present a page author with an editing interface on a web browser from which the web page content can be modified. Upon completing the modifications, the modified web page content is stored at a web server, for instance, so the updated page can be accessed by network members.

In a collaborative work environment, users besides the page author may also desire modifying the web pages. But, as mentioned above, web pages typically are modified by one author who has access to the web Page content, which may be stored at a web server. The "Sparrow" system described in a publication entitled "In-Place Editing of Web Pages: Sparrow Community-Shared Documents," Bay-Wei Chang, Xerox Palo Alto Research Center, 3333 Coyote Hill Road, Palo Alto, Calif. 94304, U.S.A., April 1998, which is incorporated herein by reference in its entirety, allows a shared web page to be modified or augmented by any contributor, hereinafter referred to as a "group-editable web page." Specifically, group-editable web pages allow users to contribute to a web page in ways the page author has defined.

Traditional Web pages can be converted into group-editable web pages by adding several additional strings of HTML syntax. The additional strings of syntax include a set of templates and a set of data contributions or items. The templates describe what data contributions the page may include, such as the number and kinds of data fields, and how those contributions will be formatted. An item is a single contribution, formatted according to the rules in one of the templates. Contributors can add new contributions, or edit previous contributions, by filling in forms where these forms require no previous knowledge of HTML. With group-editable web pages, the page author can change the layout of such a page or the format of its items.

While group-editable web pages create a user-friendly and flexible environment that enables users in a collaborative environment to easily contribute and make changes to the content in the pages, there are some limitations. First, editing the formatting information in traditional or group-editable web pages can be difficult. In group-editable web pages, the formatting information is often stored directly in the page, requiring that the information in each page be modified manually by a copy/paste operation. This method is time consuming and prone to error. One way to deal with this problem includes storing a single copy of the formatting information in a separate database, updating the single copy, and then dynamically creating web pages using that formatting information in the pages as they are generated and displayed. This approach works, but inhibits the ability to easily copy a page since the formatting information and content are not in a single file.

Second, deleting, copying, moving and/or replacing content in traditional web pages and particularly in group-editable pages can be difficult and tedious if it is done using copy/paste operations. Customized programs could be written for each group-editable web page to support single-click copying, moving, replacing, and deletion of material, but this approach is labor intensive. As a result, there has been no easy way of enabling content to be deleted, copied, moved and/or replaced in group-editable web pages especially where it is desired that the content used for replacing other content or the content being copied or moved acquires the formatting characteristics of the destination pages where the content is being placed.

SUMMARY

A system in accordance with embodiments of the present invention includes a content selection system, an information retrieval system, and a content operation system. The content selection system selects content in at least one of a first document and at least one second document. The information retrieval system obtains operation information for the selected content from at least one source code page associated with the first or second documents. Further, the content operation system performs a content operation involving the selected content based upon the obtained operation information on at least one of the first and second documents. The content operation system then updates the at least one source code page to reflect the performed content operation.

A method and a program storage device readable by a machine and tangibly embodying a program of instructions executable by the machine in accordance with embodiments of the present invention include selecting content in at least one of a first document and at least one second document, obtaining operation information for the selected content from at least one source code page associated with the first or second documents, and performing a content operation involving the selected content based upon the obtained operation information on at least one of the first and second documents where the at least one source code page is updated to reflect the performed content operation.

The present invention offers a number of benefits, such as providing an easy way of deleting, copying, moving and/or replacing content in group-editable web pages where the content used for replacing other content or the content being copied or moved acquires the formatting characteristics of the destination pages where the content is being placed. The invention is also beneficial in that users are not required to know any programming or markup languages, such as HTML, to be able to use the invention.

Additionally, the invention frees users from having to make formatting decisions or perform formatting operations for the content being deleted, copied, moved and/or replaced, whereas conventional copy/paste operations performed in traditional, unstructured web pages force users to carefully adjust the formatting of copied items or risk creating pages with inconsistent formatting. Still further, the invention provides user-friendly user interfaces for enabling users to easily define the manner in which the content is deleted, copied, moved and replaced in the group-editable web pages.

Furthermore, since content operation implementation details are defined directly in the source code pages embodying the group-editable web pages, web page authors can easily modify or customize the implementation details to meet changing needs while the group-editable web pages remain accessible to users for content operations. Selectable buttons in the group-editable web pages can be easily customized to specify particular content items or groups of content items involved in content operations. With these selectable buttons, users can easily initiate the content operations with a single selection of the buttons.

BRIEF DESCRIPTION OF THE DRAWINGS

FIG. 5 is a screen shot of a first exemplary group-editable web page in accordance with embodiments of the present invention;

FIGS. 6A-6D are screen prints of an exemplary set of code in accordance with embodiments of the present invention;

FIG. 7 is a screen print of an updated portion of the exemplary set of code shown in FIGS. 6A-6D;

FIG. 8 is a screen shot of an updated version of the first exemplary group-editable web page shown in FIG. 5;

FIG. 9 is a screen shot of a second exemplary group-editable web page in accordance with embodiments of the present invention;

FIG. 10 is a screen print of an exemplary set of code in accordance with embodiments of the present invention;

FIGS. 11A-11B are screen shots of an updated portion of the exemplary set of code shown in FIG. 10;

FIG. 12 is a screen shot of an updated version of the second exemplary group-editable web page shown in FIG. 9; and FIG. 13 is a screen shot of an exemplary user interface which shows content operation rules in accordance with embodiments of the present invention.

DETAILED DESCRIPTION

A system 10 and methods for deleting, copying, moving and replacing content among group-editable web page 40(1) in accordance with embodiments of the present invention are shown in FIGS. 1-8. In embodiments of the present invention, system 10 includes a server 12, computers 14(1)-14(n) and network 16, although the system 10 can include a lesser or greater number of different components. The system 10 has a number of advantages, including providing an easy way to manipulate content in group-editable web page 40(1) without requiring users to manually program each of the pages.

Figure 1:
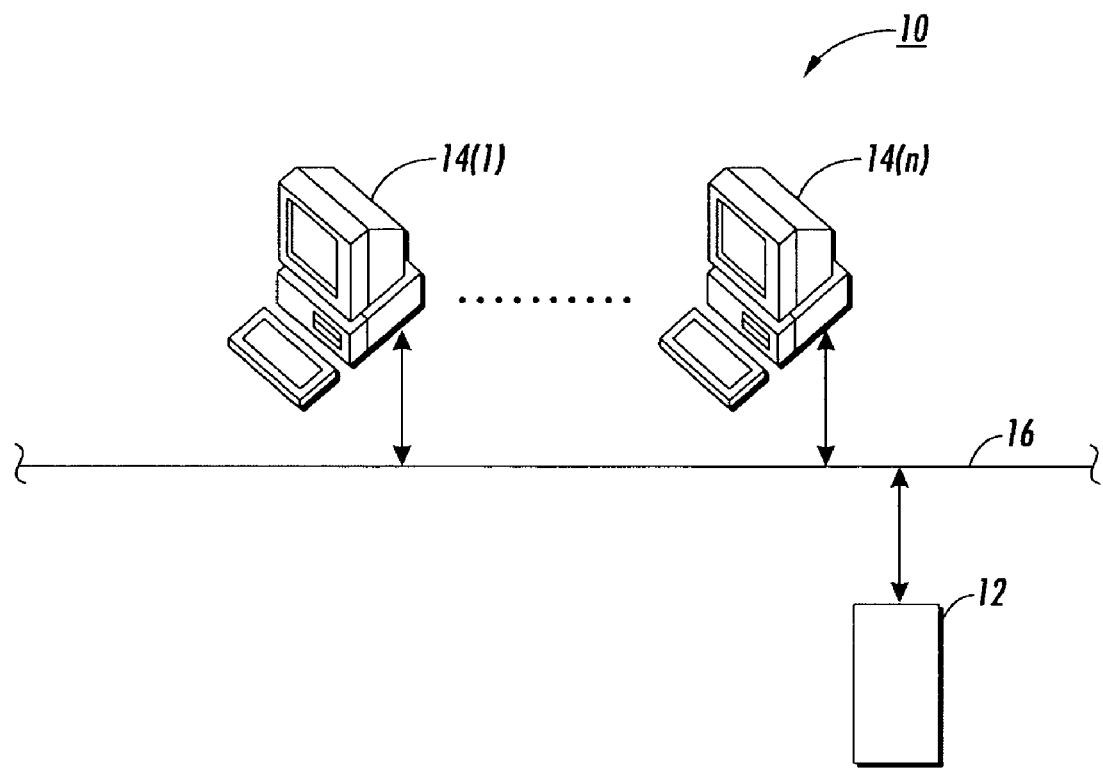
FIG. 1 is a block diagram of a system for deleting, copying, moving and replacing content in group-editable web pages in accordance with embodiments of the present invention.

Referring to FIG. 1, the devices in system 10, such as server 12 and computers 14(1)-14(n), are communicatively coupled to each other by network 16. These devices are provided for exemplary purposes only and may comprise laptop computers, personal digital assistants, cellular telephones and other devices. Group-editable web pages 40(1)-40(2), 90(1)-90(2) and 100 each comprise documents, typically hypertext documents, which can be accessed by users to edit, add, move, copy and delete content as described herein in accordance with embodiments of the present invention. The term "content" as used in accordance with embodiments of the present invention should be interpreted broadly to include information, data, text, numbers, Boolean values and other equivalent terms. These group-editable web pages 40(1)-40(2), 90(1)-90(2) and 100 may be coded using HTML, although a number of other markup and/or programming languages may be used, such as XML, XHTML, and Javascript.

Figure 2:
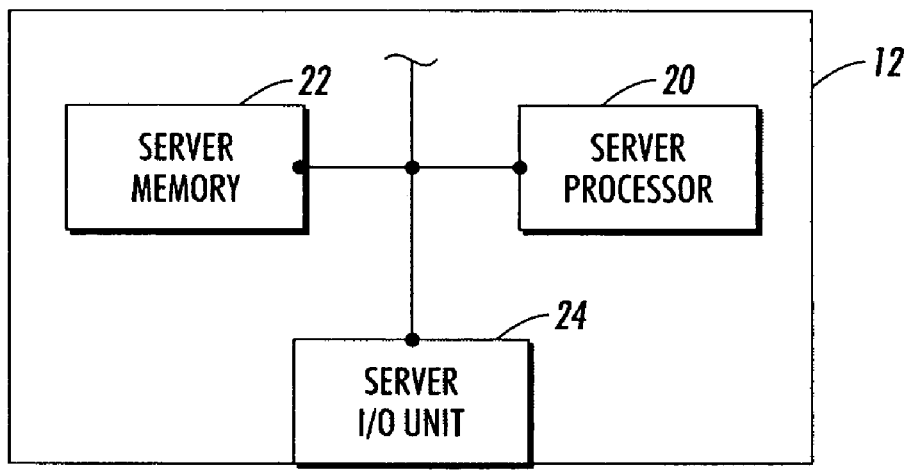
FIG. 2 is a block diagram of an exemplary server used in the system shown in FIG. 1.

Referring to FIG. 2, the server 12 includes a server processor 20, a server memory 22 and a server I/O unit 24, which are coupled together by one or more bus systems or other communication links, although the server 12 can comprise other elements in other arrangements. The server processor 20 executes a portion of the instructions for deleting, copying, moving and replacing content in group-editable web pages 40(1)-40(2), 90(1)-90(2) and 100 in accordance with embodiments of the present invention as described herein and illustrated in FIG. 4, although the processor 20 may be capable of performing other types of functions.

The instructions may be expressed as executable programs written in a number of computer programming languages, such as Python, BASIC, Pascal, C, C++, C#, Java, Perl, COBOL, FORTRAN, assembly language, machine code language, or any other computer code or language that can be understood and executed by the server processor 20. Further, the programmed instructions are stored in the server memory 22 for execution by the server processor 20, although some or all of these instructions may be stored and executed elsewhere, such as computer 14(1).

The server memory 22 comprises one or more types of fixed or portable memory accessible by the server processor 20, such as ROM, RAM, SRAM, DRAM, DDRAM, hard and floppy-disks, CDs, DVDs, magnetic tape, optical disk, ferroelectric and ferromagnetic memory, electrically erasable programmable read only memory, flash memory, charge coupled devices, smart cards, or any other type of computer-readable media. The server memory 22 is used to store these programmed instructions as well as other information. Server I/O unit 24 enables the server 12 to communicate with computers 14(1)-14(n) by way of network 16, although the unit 24 may be coupled directly to computers 14(1)-14(n).

Figure 3:
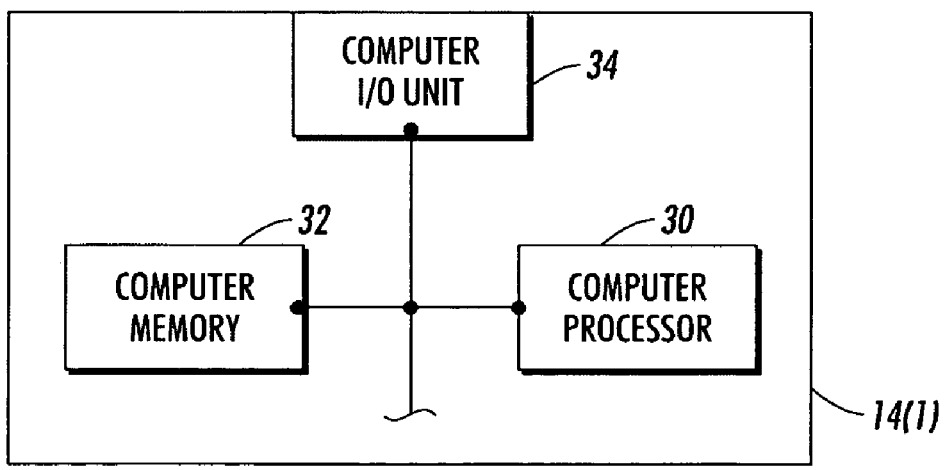
FIG. 3 is a block diagram of an exemplary computer used in the system shown in FIG. 1.

Referring to FIG. 3, the computer 14(1) includes a computer processor 30, a computer memory 32 and a computer I/O unit 34, which are coupled together by one or more bus systems or other communication links, although the computer 14(1) can comprise other elements in other arrangements. Further, computer 14(1) includes user input devices, such as a keyboard and a mouse (not illustrated).

Figure 4:
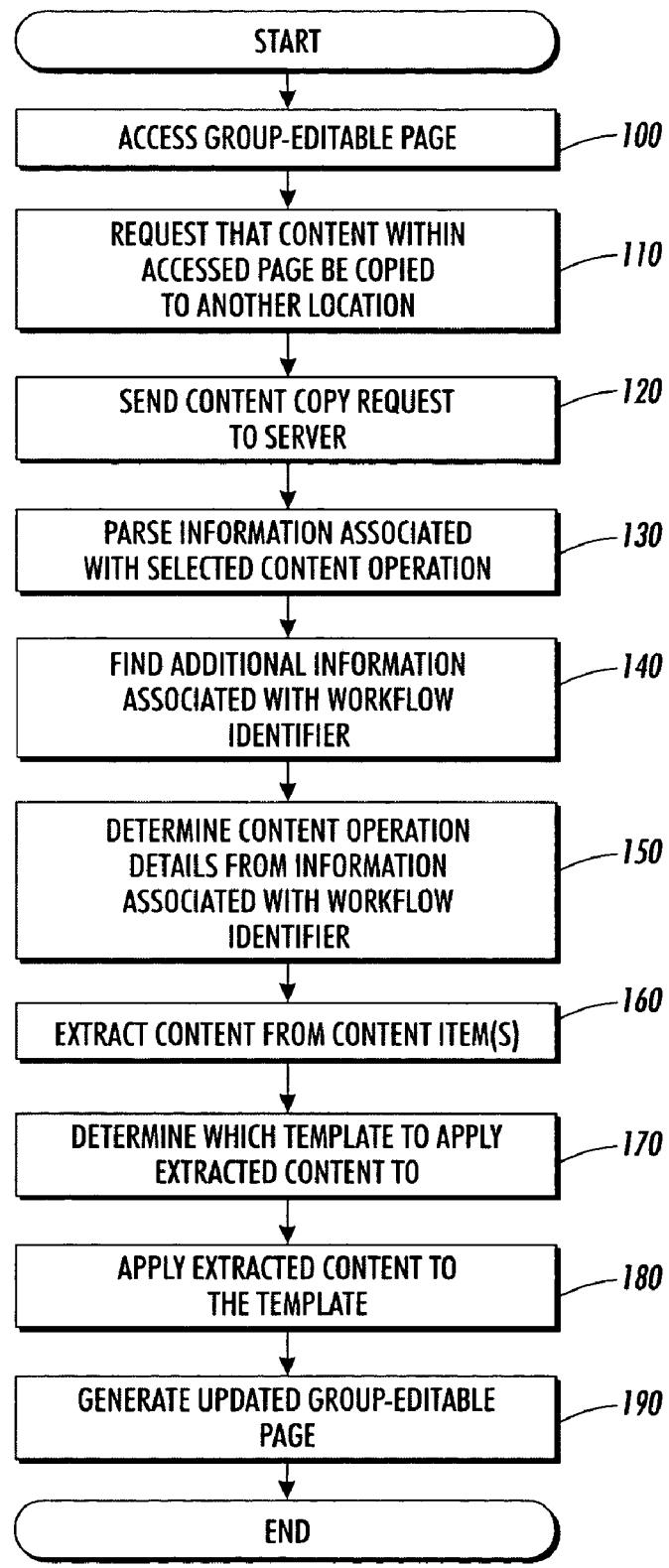
FIG. 4 is a flow chart of a process for deleting, copying, moving and replacing content in group-editable web pages in accordance with embodiments of the present invention.

The computer processor 30 executes a portion of the instructions for deleting, copying, moving and replacing content in group-editable web pages 40(1)-40(2), 90(1)-90(2) and 100 in accordance with embodiments of the present invention as described herein and illustrated in FIG. 4, although the processor 30 may be capable of performing other types of functions. The instructions may be expressed as executable programs written in the same types of languages mentioned above with respect to the server 12 or any other computer code or language that can be understood and executed by the computer processor 30. Further, at least a portion of the instructions embody a web browser application, such as Internet Explorer™, which is used by the computer 14(1) to interpret and display data from the group-editable web pages 40(1)-40(2), 90(1)-90(2) and 100 sent from the server system 12 as described further herein, although other types of applications may be used.

The instructions are stored in the computer memory 32 for execution by the computer processor 30, although some or all of these instructions and data may be stored elsewhere, such as server 12. The computer memory 32 is the same type of memory as the server memory 22, although other types of memory may be used. The computer I/O unit 34 enables the computer 14(1) to communicate with server 12 by way of network 16, although the computer 14(1) may communicate directly with server 12. Additionally, the computer 14(n) comprises the same elements as computer 14(1).

The network 16 comprises a network, such as the World Wide Web, although other types of line-based networks may be used, such as Intranets (e.g., LANs, WANs) using telephone line and/or coaxial cable, ISDN networks, as well as wireless networks (e.g., satellite, IR, radio), and combinations thereof.

The operation of the system 10 for deleting, copying, moving and replacing content in group-editable web page 40(1) in accordance with embodiments of the present invention will now be described with reference to FIGS. 4-8. Referring to FIG. 4 and beginning at step 100, by way of example only, a user at one of the devices on the network 16, such as the computer 14(1), via an input device, and with the cooperation of the computer processor 30, computer memory 32 and computer I/O unit 34, requests a group-editable web page 40(1), shown in FIG. 5, from the server 12. For example, a user of computer 14(1) enters a URL in a Web browser (not illustrated) operating on the computer 14(1) to retrieve the group-editable web page 40(1) from the server 12, although the page 40(1) can be found using search engines.

In this example, the page 40(1) includes introductory information, such as the "San Francisco Bay Area Office" title, an "Active Customers" heading preceding a list comprising rows of customer item information 42(1)-42(3), and a "Customers Who Need to Be Billed" heading preceding a list comprising a row of billable customer item information 44(1), although there can be a lesser or greater number of rows of customer and billable customer item information. In embodiments of the present invention, the exemplary content included in the group-editable web page 40(1) is provided for ease of description and illustrative purposes only.

Additionally, the page 40(1) includes copy-to-regional-page button 46, copy-to-all-pages button 48 and copy-entire-page button 50, although hyperlinks may be used instead of buttons. Still further, the page 40(1) may include selectable icons (not illustrated) associated with each of the rows of information 42(1)-42(3) and 44(1) to provide users with the option of editing and/or adding content items, as disclosed in U.S. patent application Ser. No. 09/731,912 to Eric Allan Bier, titled "SYSTEM AND METHODS FOR EDITING A WEB PAGE," filed Dec. 8, 2000, which is incorporated herein by reference in its entirety.

Referring to FIGS. 6A-6D, portions of an exemplary set of code 41(1) that are sent from server 12 to the computer 14(1) to display the page 40(1) illustrated in FIG. 5 are shown. In this example, the code 41(1) is written in HTML, although other markup and/or programming languages can be used. Further, the exemplary code 41(1) in FIGS. 6A-6D is provided for ease of description and illustrative purposes only, and may include a lesser or greater amount and other types of information.

Referring to FIG. 6A, the introductory portion 52 supports the introductory information in the page 40(1) shown in FIG. 5, such as the "San Francisco Bay Area Office" title and provides other information, such as a base reference to enable the server 12 to find files referenced in the code 41(1). Referring to FIG. 6C, the customer introductory section portion 62 supports the "Active Customers" heading in the page 40(1); and the customer item portions 64(1)-64(3) support customer item information 42(1)-42(3), respectively, in page 40(1). Referring to FIG. 6D, the billable introductory section portion 66 supports the "Customers Who Need to Be Billed" heading in the page 40(1); and the billable item portion 68(1) supports the billable customer item information 44(1). Further in FIG. 6D, the copy-to-regional-page portion 70 supports the copy-to-regional-page button 46; the copy-to-all-pages portion 72 supports the copy-to-all-pages button 48; and the copy-entire-page portion 74 supports the copy-entire-page button 50.

It should be noted that the server 12 initially creates the code 41(1) using the processes disclosed in the '912 application, except here the server 12 additionally includes a customer workflow identifier 55 and a billable workflow identifier 57 (FIG. 6A) in the template portions 54, 56, although the entire code 41(1) can be written manually or the templates 54, 56 can be modified to include the workflow identifiers 55, 57 using template editing interfaces disclosed in the '912 application. Further, the server 12 includes the workflow identifier definition portions 60(1)-60(4) (FIG. 6B) in the code 41(1) using the same process described above with respect to including the workflow identifiers 55, 57, although again, the entire code 41(1) can be written manually or can be modified to include the workflow identifier portions 60(1)-60(4) using the editing interfaces disclosed in the '912 application.

By way of example only and referring back to FIG. 5, a user at computer 14(1) may desire copying one or more rows of the customer item information 42(1)-42(3), such as customer item information 42(3), to another location, such as underneath the "Customers Who Need to Be Billed" heading in page 40(1), without having to manually rewrite the code 41(1), although the customer item information 42(3) may instead be moved to the other location, or the customer item 42(3) may replace another content item at the other location or be deleted.

At step 110, in this example the user at computer 14(1) selects the copy-customer-item-button 43(3) that is associated with customer item information 42(3), although the server 12 can be configured to automatically perform steps 110-190 at set time intervals or upon particular events occurring, for example. In response, the computer 14(1) initiates the form action identified in the form identifier portion 58 (FIG. 6B), although an anchor tag may be used instead of the form identifier portion 58 where forms are not used.

At step 120, the browser operating on computer 14(1) sends workflow information 65 encoded in the "name=" attribute of the input tag within the customer item portion 64(3) (FIG. 6C) along with information from the HTTP header for the page 40(1) identifying the source of the "name=" attribute information, such as the HTTP referrer URL of the page 40(1), to a Java servlet on server 12 identified in the form identifier portion 58 (FIG. 6B), although the servlet may reside elsewhere, other types of servlets may be used, and CGI scripts, Javascripts or Applets may be used. Additionally, in this example the information encoded in the name and value attributes in the workflow identifier definition portions 60(1)-60(4) is also sent to the Java servlet identified in the form identifier portion 58, although the information associated with the name and value attributes could be stored as HTML comments in the code 41(1) or the information may be stored in a separate location, such as in another file on the server 12. Further, the server 12 stores a complete version of the code 41(1) in the server memory 22 so that the server 12 may refer to portions of the code during the ensuing processing steps as will be described further herein or in case the content operation fails.

As shown in FIG. 6C in this example, the workflow information 65 encoded in the "name=" attribute in the customer item portion 64(3) is "SparrowWorkflow-1102-3," although other workflow information may be encoded in the information 65. At step 130, the server 12 parses the workflow information 65 to find a workflow method identifier, which is delineated by the first "-" symbol in the workflow information, although other symbols may be used. Here, the workflow method identifier is "SparrowWorkflow," although other identifiers may be used. Based on the server 12 finding the "SparrowWorkflow" method identifier, the server 12 determines that some type of content operation will be performed (e.g., copy, move, delete or replace) and continues parsing the remainder of the workflow information 65 to find a content element identifier (e.g., "1102") and a workflow information identifier (e.g., "3") in the same manner the workflow method identifier was found.

At step 140, the server 12 searches the information encoded in the name attributes in the workflow identifier definition portions 60(1)-60(4) (FIG. 6B) provided to the server 12 at step 120 to find the "SparrowWorkflow" method identifier, although the server 12 can search portions of code 41(1) where the information is stored as HTML comments or the server can search different pages for this information. In this example, the "SparrowWorkflow" identifier is encoded in the name attribute in each of the workflow identifier definition portions 60(1)-60(4). The server 12 then determines which of the workflow identifier definition portions 60(1)-60(4) has the particular workflow information identifier (e.g., "3") parsed from the workflow information 65 (FIG. 6C) at step 130. In this example, the server 12 determines that the name attribute in each input tag in the workflow identifier definition portion 60(1) has a workflow information identifier value of "3."

At step 150, the server 12 parses an implementation detail identifier (e.g., OPERATION_IDENTIFIER, DESTINATION_IDENTIFIER1, etc.) from each name attribute in the workflow identifier definition portion 60(1). For each implementation detail identifier parsed from each name attribute in the workflow identifier definition portion 60(1) in this example, the server 12 stores each identifier along with its corresponding value attribute in server memory 22. For example, the server 12 determines that the workflow identifier definition portion 60(1) has: a value attribute (e.g., "value="..."") associated with the "OPERATION_IDENTIFIER" encoded with a string "Copy"; a value attribute associated with the "DESTINATION_IDENTIFIER1" encoded with a string "THISPAGE"; a value attribute associated with the "LOCATION_IDENTIFIER1" encoded with a string "1100"; and a value attribute associated with the "POSITION_IDENTIFIER1" encoded with a string "after."

At step 160, the server 12 determines that the content operation in this example is a "copy" operation since the value attribute associated with the "OPERATION_IDENTIFIER" in the workflow identifier definition portion 60(1) is encoded with the string "Copy," although the value attribute may be encoded with other strings for other content operations, such as "Move," "Delete" or "Replace" for move, delete and replace operations, respectively. In this example, however, the server 12 copies information from the customer item portion 64(3) (FIG. 6C), corresponding to the customer item information 42(3) (FIG. 5), to a location encoded in one or more value attributes in the workflow identifier definition portion 60(1), as will be described in further detail herein below.

Referring back to FIG. 6C, the server 12 prepares to extract content from the customer item portion 64(3). First, the server 12 uses the template upon which the customer item portion 64(3) is based to determine what types of content are included within the item portion 64(3), and how that content is organized within the item portion 64(3). The server 12 determines which template a content item (e.g., customer item portion 64(3)) is based on using the "content type" of the content item, although other methods may be used. The server 12 determines the content type of the customer item portion 64(3) by searching the portion 64(3) for a unique identifier (e.g., "1102"), obtained above in step 190, in between "<!--Item-" and "-->" strings, and parsing the content type (e.g., "Customers") from the statement.

The server 12 then searches the code 41(1) for statements with the string "SparrowTemplate" in combination with the string "Customers." In this example, the server 12 finds customer template portion 54 (FIG. 6A) with the string "SparrowTemplate" in combination with the string "Customers." The server 12 parses the template portion 54 by examining each of the name attributes (e.g., "name=...") within the field tags (e.g., "<field type=...>") in the template portion 54. The server 12 then stores the information encoded in each name attribute, such as "Company," "Contact," "Phone" and "Address." The information is stored in an ordered data structure, such as an array, in the server memory 22, although other data structures may be used. Further, the server 12 uses this information to establish key-value pairs with respect to content extracted from the customer item portion 64(3) (FIG. 6C) as discussed in greater detail below.

The server 12 parses the customer item portion 64(3) (FIG. 6C) to extract content found between each pair of strings "<!--+-->" and "<!--/-->." As the server 12 encounters each pair of strings, the extracted content is stored with each corresponding key (e.g., Company, Contact, Phone, Address) from the customer template 54 in the ordered data structure. In this example, the first key encountered by the server 12 while examining each of the name attributes within the field tags in the customer template 54 is the string "Company," and the content found between the first pair of strings "<!--+-->" and "<!--/-->" within the customer item portion 64(3) is "Cameo Curtains." The remainder of the customer item portion 64(3) is parsed in the same manner.

Thus, the information is organized within the server memory 22 in the manner shown below in Table 1:

TABLE 1

| KEY | VALUE |
| --- | --- |
| Company | Cameo Curtains |
| Contact | <A HREF="mailto:chan@cameocurtain.com"> Carol Chan </A> |
| Phone | 408-345-6789 |
| Address | <hide 333 Cameo Court, Courtney CA 94124> |

At step 170, the server 12 determines which template to use for creating a new content item at the new location for copying the extracted content to based on the template associated with the content item where the new item is to be placed near, as indicated by the "LOCATION_IDENTIFIER1," although the workflow identifier definition portion 60(1) (FIG. 6B) may explicitly define the template to use for formatting the copied content using a value attribute encoded with an "ITEM_TYPE_IDENTIFIER" string that specifies the template. To find the template associated with the new location, the server 12 parses the code 41(1) to find the location of the value "1100," which is the value associated with the "LOCATION_IDENTIFIER1" parsed from the workflow identifier definition portion 60(1) (FIG. 6B) as explained above in connection with step 150. In this example, the server 12 finds the value "1100" associated with the billable item portion 68(1) (FIG. 6D) corresponding to the billable customer item information 44(1) shown in FIG. 5. The server 12 determines which template the billable item portion 68(1) is based on in the same manner described above in connection with step 160 with respect to determining which template the customer item portion 64(3) is based on. Accordingly, the server 12 determines that the billable item portion 68(1) is based on the billable template portion 56 (FIG. 6A).

At step 180, the server 12 applies the content extracted from the customer item portion 64(3) (shown underneath the "VALUE" heading in Table 1 above) to the billable template portion 56 to create a new billable content item. Basically, the server 12 copies some portions of the billable template portion 56 directly into server memory 22 without any changes while changing particular portions, such as the field tags, to incorporate the content extracted at step 170, and storing those changed portions in the memory 22. The order of the unchanged and the changed portions of the billable template portion 56 is maintained and each of the changed portions are formatted with the "<!--+-->" and "<!--/-->" strings as they are copied into the memory 22.

In particular, server 12 extracts the information encoded in the name attribute within each field tag statement of the billable template portion 56. The server 12 then matches the extracted information with a key from Table 1 above. For example, the server 12 finds the first field tag statement in the template portion 56 (i.e., "<field . . . >") which has a name attribute with a value of "Company." Referring to Table 1 above, the server 12 finds the key "Company" and obtains the corresponding value of "Cameo Curtains."

The server 12 then determines whether the field tag statement in the billable template portion 56 calls for hiding or showing the information associated with that particular field tag. If the field tag statement in the billable template portion 56 includes a format attribute with a value of "<hide % s>," then the server 12 replaces "% s" with the value from Table 1 (i.e., "Cameo Curtains") so that the string which would be stored in server memory 22 in place of the field tag statement would become "<hide Cameo Curtains>". In this example, however, the first field tag statement does not include a format attribute with a value of "<hide % s>." Therefore, the server 12 copies the string "Cameo Curtains" from Table 1 above into the server memory 22 in place of the field tag statement with the name attribute having a value of "Company." This process is repeated for the other field tag statements in the billable template portion 56.

In this example, however, the "Address" key in Table 1 above is associated with a value of "<hide 333 Cameo Court, Courtney Calif. 94124>." This value was not displayed with the customer item information 42(3) in the page 40(1) (FIG. 5) because the "<hide . . . >" tag is ignored by the browser operating on the computer 14(1), although other tags may be used. Here, the server 12 determines whether the field tag statement in the billable template portion 56 having a name attribute with a value of "Address" includes a format attribute with a value of "<hide % s>." In this example, however, the field tag statement does not include a format attribute with a value of "<hide % s>." As a result, the server 12 strips the "<hide . . . >" markup from the value (i.e., "<hide 333 Cameo Court, Courtney Calif. 94124>") obtained from Table 1 and copies the string "333 Cameo Court, Courtney Calif. 94124" into the server memory in place of the field tag statement with the name attribute having a value of "Address."

As mentioned earlier, the statements in the template portion 56 which are not field tags are stored in the server memory 22 without any changes. This ensures that the content being copied acquires the formatting associated with the new location where the content is being placed. For instance, the customer template portion 54 and the billable portion template 56 use the same formatting tags, except that the customer template portion 54 uses a bold formatting tag (i.e., <b> . . . </b>) to format the information that will replace the statement with the name attribute encoded with the string "Phone," whereas the billable template portion 56 does not include any bold formatting tags associated with the statement with the name attribute encoded with the string "Phone."

At step 190, the unchanged and the changed portions of the billable template portion 56 which were stored in the server memory 22 as described above at step 180 are used by the server 12 for generating updated code 41(2) to include a new billable item portion 68(2), as shown in FIG. 7. The updated code 41(2) is identical to the code 41(1), except the code 41(2) includes the new billable item portion 68(2). Further, the code 41(2) illustrated in FIG. 7 shows just the portion(s) of the code 41(1) which have been updated as described further herein below.

The server 12 determines the location where the new content item (i.e., billable item portion 68(2)) should be placed by extracting the string encoded in the value attribute associated with the "DESTINATION_IDENTIFIER1" string encoded in one of the name attributes in workflow identifier definition portion 60(1), as described above at step 150. In this example, the string "THISPAGE" was encoded in the value attribute associated with the "DESTINATION_IDENTIFIER1" string. In embodiments of the present invention, the string "THISPAGE" means that the new content item will be placed at a location or file (i.e., code 41(1)) identified by the HTTP referrer URL for the page (i.e., page 40(1)) from where the content operation request was made. As a result, the server 12 determines that the new billable item portion 68(2) will be placed somewhere within the code 41(1) to create the updated code 41(2).

The server 12 then determines where the new billable customer item information 44(2) should be placed within the code 41(1). The server 12 extracts the string encoded in the value attribute that is associated with the "LOCATION_IDENTIFIER1" string encoded in the name attribute of workflow identifier definition portion 60(1). In this example, the server 12 determines that the "LOCATION_IDENTIFIER1" string is associated with the string "1100." As a result, the server 12 determines that the new billable item portion 68(2) will be placed somewhere within the code 41(1) that is near an item with the unique identifier of "1100."

Further, the server 12 determines where the new billable item portion 68(2) should be placed with respect to an item having a unique identifier of "1100" by extracting the string encoded in the value attribute associated with the "POSITION_IDENTIFIER1" string encoded in the name attribute in the workflow identifier definition portion 60(1). In this example, the server 12 determines that the string "after" is encoded in the value attribute associated with the "POSITION_IDENTIFIER1" string in the name attribute in workflow identifier definition portion 60(1). As a result, the server 12 determines that the new billable item portion 68(2) should be inserted after the billable item portion 68(1) in code 41(1) to create the updated page 41(2).

Basically, the server 12 generates the new billable item portion 68(2) by including each of the unchanged and changed portions of the billable template portion 56, which were copied into the server memory 22 as described above at step 180, except the server 12 replaces the billable template identifier 80 from the billable template portion 56 (FIG. 6A)

with a billable item identifier 67 (FIG. 7). The server 12 also replaces the billable workflow identifier 57 from the billable template portion 56 with a billable item workflow identifier 69. Further, the server 12 generates a unique identifier (e.g., "1103") and includes the new identifier in the billable item identifier 67 and the billable item work flow identifier 69, although the server 12 may use the unique identifier of the customer item portion 64(3) where the customer item 64(3) is being moved to the new location. Also, the server 12 replaces a default identifier (e.g., "0") in the billable work flow identifier 57 of the billable template portion 56 (FIG. 6A) with the unique identifier (i.e., "1103").

The server 12 then sends the updated code 41(2) to the computer 14(1). In response, the computer 14(1) displays the updated web page 40(2) shown in FIG. 8 using the updated code 41(2). Here, the updated page 40(2) includes the new billable customer item information 44(2). As mentioned above in connection with step 180, the content being copied from the customer item information 42(3) to create the new billable customer item information 44(2) acquires the formatting characteristics defined by the billable template portion 56. Thus, the phone number in the new billable customer item information 44(2) is not in bold whereas the phone number in the customer item information 42(3) is in bold, for example. Furthermore, the address information associated with customer item information 42(3) that is hidden as shown in FIGS. 5 and 8, is not hidden with regard to the new billable customer item information 44(2).

In embodiments of the present invention, where a content item, such as the customer item portion 64(3), is being moved (i.e., "Move" content operation) to the new location instead of being copied, steps 100-180 are performed as described herein except the customer item portion 64(3) is deleted from the code 41(1) during creation of the updated code 41(2). Where the item (i.e., customer item portion 64(3)) is replacing (i.e., "Replace" content operation) another content item, such as the billable item portion 68(1), steps 100-190 are performed as described herein, except the billable item portion 68(1) is deleted from the code 41(1) and the billable item portion 68(2) is copied into the code 41(1) at the same location in code 41(1) where the billable item portion 68(1) was before being deleted to create the updated code 41(2). Further, where a content item is being deleted (i.e., "Delete" content operation), steps 100-160 and 190 are performed as described herein, except the portion of step 160 with respect to extracting content from the customer item portion 64(3), steps 170-180, and the portion of step 190 with respect to including the new billable item portion 68(2) in the code 41(1) to create the updated code 41(2) are not performed, and the customer item portion 64(3) is deleted from the code 41(1) during creation of the updated code 41(2).

The operation of the system 10 for copying content from a first group-editable web page 40(1) to a second group-editable web page 90(1) in accordance with another embodiment of the present invention will now be described with reference to FIGS. 4 and 9-12. Steps 100-180 are performed in the same manner described above in connection with one or more embodiments of the present invention, except as described herein.

In this example and referring back to FIG. 5, at step 100 the user at computer 14(1) desires copying customer content items, such as each of the rows of customer item information 42(1)-42(3), from the first group-editable web page 40(1) to a second group-editable web page 90(1) shown in FIG. 9, although the user may also desire copying the rows of customer item information 42(1)-42(3) to one or more other pages and/or copying the row of billable customer item information 44(1) to the same one or more other pages or to the second group-editable web page 90(1). In this example, the second group-editable web page 90(1) includes a first row of second page customer item information 92(1) with a corresponding second page copy-customer-item-button 93(1). In embodiments of the present invention, the exemplary content included in the second group-editable web page 90(1) is provided for ease of description and illustrative purposes only.

Step 110 is then performed as described above, except the user at computer 14(1) selects the copy-to-regional-page button 46 instead of the copy-customer-item-button 43(3), although the user may instead select the copy-to-all-pages button 48 where the user instead desires copying the row of billable customer item information 44(1) to one or more other pages. At step 120 and referring to FIG. 6D, the browser operating on the computer 14(1) sends regional page copy workflow information 82 encoded in the "name=" attribute of the region page copy button input tag 70 to the server 12, although the browser may send all pages copy workflow information 84 encoded in the name attribute of the all pages copy button input tag 72 where the copy-to-all-pages button 48 was selected. Step 130 is performed as described above, except just the workflow identifier (e.g., Sparrow Workflow) and the workflow information identifier (e.g., "5") are parsed from the regional page copy workflow information 82, although again, the workflow identifier (e.g., Sparrow Workflow) and the workflow information identifier (e.g., "6") are parsed from the all pages copy workflow information 84 where the copy-to-all-pages button 48 was selected. At step 140, the server 12 determines which of the workflow identifier definition portions 60(1)-60(4) has the particular workflow information identifier (e.g., "5"). In this example, the server 12 determines that the name attribute in each input tag in the workflow identifier definition portion 60(2) has a workflow information identifier value of "5," although the server 12 determines the workflow identifier definition portion 60(3) has a workflow information identifier value of "6" where the copy-to-all-pages button 48 was selected.

At step 150, the server 12 parses an implementation detail identifier (e.g., OPERATION_IDENTIFIER, CONTENT_TYPE_IDENTIFIER, DESTINATION_IDENTIFIER1, etc.) from each name attribute in the workflow identifier definition portion 60(2) and stores each identifier along with its corresponding value attribute in server memory 22, although the server 12 parses the implementation detail identifiers from each name attribute in the workflow identifier definition portion 60(3) and stores each identifier along with its corresponding value attribute in server memory 22 where the copy-to-all-pages button 48 was selected. For example, the server 12 determines that the workflow identifier definition portion 60(2) has: a value attribute (e.g., "value=" . . . ") associated with the "OPERATION_IDENTIFIER" encoded with a string "Copy"; a value attribute associated with the "CONTENT_TYPE_IDENTIFIER" encoded with a string "Customers"; a value attribute associated with the "DESTINATION_IDENTIFIER 1" encoded with a string "flexibleproject_calif.html"; a value attribute associated with the "LOCATION_IDENTIFIER1" encoded with a string "1072"; and a value attribute associated with the "POSITION_IDENTIFIER1" encoded with a string "before."

At step 160, the server 12 determines that the content operation in this example is a "copy" operation since the value attribute associated with the "OPERATION_IDENTIFIER" in the workflow identifier definition portion 60(2) is encoded with the string "Copy." The server 12 also determines which content item(s) should be copied based on the name attribute "CONTENT_TYPE_IDENTIFIER" in the workflow identifier definition portion 60(2) being associated with a value attribute encoded with a string value of "Customers," although the server 12 determines the workflow identifier definition portion 60(3) being associated with a value attribute encoded with a string value of "Billable" where the copy-to-all-pages button 48 was selected.

Thus, the customer item portions 64(1)-64(3) (FIG. 6C) which are based on the "Customers" template will be copied in this example, although the billable item portion 68(1) (FIG. 6D) will be copied where the copy-to-all-pages button 48 was selected. The server 12 extracts content from each of the customer item portions 64(1)-64(3), corresponding to the rows of customer item information 42(1)-42(3) (FIG. 5), in the same manner described above with respect to extracting content from the customer item portion 64(3), and stores the extracted content in the server memory 22, although the server 12 extracts content from the billable item portion 68(1) and stores the extracted content where the copy-to-all-pages button 48 was selected.

The server 12 then determines which template in the second page code 91(1) found at the location (i.e., flexibleproject_calif.html) identified by the "DESTINATION_IDENTIFIER1" in the workflow identifier definition portion 60(2) corresponds to the second page customer item portion 94(1) (FIG. 10) in the same manner described above in connection with step 160 with respect to determining which template the customer item portion 64(3) is based on. Accordingly, the server 12 determines that the second page customer item portion 94(1) is based on a customer template portion (not illustrated) defined in the second page code 91(1). In this example, the customer template portion defined in the second page code 91(1) is identical to the customer template portion 54 defined in the first page code 41(1), although the templates may be different. Where the copy-to-all-pages button 48 is selected at step 110, the server 12 also determines which template in a third page code (not illustrated) found at the location (i.e., flexibleproject_co.html) identified by the "DESTINATION_IDENTIFIER2" in the workflow identifier definition portion 60(3) corresponds to a third page customer item (not illustrated) that is identified by the value attribute associated with the "LOCATION_IDENTIFIER2" in the workflow identifier definition portion 60(3) in same manner described above.

Steps 180-190 are performed as described above, except the server 12 applies the content extracted from each of the customer item portions 64(1)-64(3) (FIG. 6C) to the customer template portion to generate an updated second page code 91(2) with new second page customer item portions 94(2)-94(4), and assigns a unique identifier to each of the new second page customer item portions 94(2)-94(2) as shown in FIGS. 11A-11B, although the server 12 applies the content extracted from the billable item portion 68(1) to the customer template portion to generate the updated code 91(2) where the copy-to-all-pages button 48 is selected at step 110.

In this example, the server 12 stores the string "flexibleproject_calif.html" which was encoded for the value attribute associated with the "DESTINATION_IDENTIFIER1" value attribute in the workflow identifier definition portion 60(2), although the server 12 stores the string "flexibleproject_calif.html" associated with the "DESTINATION_IDENTIFIER1" value attribute and the string "flexibleproject_co.html" associated with the "DESTINATION_IDENTIFIER2" value attribute in the workflow identifier definition portion 60(3) where the copy-to-all-pages button 48 is selected at step 110. As a result, the server 12 determines that each of the new second page customer item portions 94(2)-94(4) will be placed somewhere within the second page code 91(1) to create the updated the second page code 91(2).

The server 12 then determines the location within the second page code 91(1) where the new second page customer item portions 94(2)-94(4) should be placed, although the server 12 determines the location within the second page code 91(1) and a third page code (not illustrated) where a new customer item based on the content extracted from the billable item portion 68(1) should be placed where the copy-to-all-pages button 48 is selected at step 110. In this example, the server 12 determines that the "LOCATION_IDENTIFIER1" string in the workflow identifier definition portion 60(2) is associated with the string "1072" and is stored in the server memory 22.

Further, the server 12 determines that the string "before" is encoded in the value attribute associated with the "POSITION_IDENTIFIER1" string in the name attribute in workflow identifier definition portion 60(2), although the server 12 also determines that the "LOCATION_IDENTIFIER2" string is associated with the string "1072" and the string "before" is encoded in the value attribute associated with the "POSITION_IDENTIFIER2" string in the name attribute in workflow identifier definition portion 60(3) where the copy-to-all-pages button 48 is selected at step 110. As a result, the server 12 determines that the new second page customer item portions 94(2)-94(4) should be inserted before the second page customer item portion 94(1) in the second page code 91(1) to create the updated second page code 91(2), although the server 12 determines that the new customer item based on the content extracted from the billable item portion 68(1) should be inserted before the second page customer item portion 94(1) in the second page code 91(1) to create the updated second page code 91(2) and should also be inserted in a third page code (not illustrated) before a customer item in the third page code where the copy-to-all-pages button 48 is selected at step 110.

The server 12 then sends the updated second page code 91(2) to the computer 14(1). The updated second page code 91(2) is identical to the second page code 91(1), except the updated portions shown in FIGS. 11A-11B include the new second page customer item portions 94(2)-94(4). The computer 14(1) displays the updated second web page 90(2) shown in FIG. 12 using the updated second page code 91(2), although the server 12 also generates an updated third web page (not illustrated) where the copy-to-all-pages button 48 is selected at step 110. Here, the updated second page 90(2) includes new rows of second page customer item information 92(2)-92(4) with corresponding second page copy-customer-item-buttons 93(3)-93(4) in addition to the first second page customer item information 92(1) with the corresponding second page copy-customer-item-button 93(1). Where the copy-to-all-pages button 48 is selected at step 110, the updated second page 90(2) includes a new row of second page customer item information (not illustrated) that is based on the extracted content from the billable item portion 68(1) (FIG. 6D) with a corresponding second page copy-customer-item-button (not illustrated) and the updated third page (not illustrated) includes a new row of third page customer item information (not illustrated) that is based on the extracted content from the billable item portion 68(1) with a corresponding third page copy-customer-item-button (not illustrated).

The operation of the system 10 for copying content among group-editable web pages 40(1)-40(2), 90(1)-90(2) and 100 in accordance with another embodiment of the present invention will now be described with reference to FIGS. 4-13.

Steps 100-180 are performed in the same manner described above, except as described herein.

At step 130, the server 12 parses the workflow information 65 (FIG. 6C) to find a workflow method identifier (e.g., "SparrowWorkflow"), a content element identifier (e.g., "1102") and a workflow information identifier (e.g., "3") as described above. At step 140, the server 12 searches the information encoded in the name attributes in the workflow identifier definition portions 60(1)-60(4) (FIG. 6B) and determines that the name attribute in each input tag in the workflow identifier definition portion 60(1) has a workflow information identifier value of "3." In this example, however, the workflow identifier definition portion 60(1) does not fully describe the workflow implementation details. Instead, the workflow identifier definition portion 60(1) identifies a separate document (i.e., rules code page) where the complete workflow implementation details can be found. Thus, the workflow identifier definition portion 60(1) in this example has the following structure:

```
<input type="hidden" name="SparrowWorkflowInfo-3-INFORMATION_DOCUMENT"
value="workflow_information.html">
<input type="hidden" name="SparrowWorkflowInfo-3-INFORMATION_RULE" value="1">
```

At step 150, the server 12 parses the implementation detail identifier (i.e., "INFORMATION_DOCUMENT" and "INFORMATION_RULE") from each name attribute in the workflow identifier definition portion 60(1) and stores each identifier in server memory 22. Here, the server 12 determines that the workflow identifier definition portion 60(1) has: a value attribute (e.g., "value=" . . . "") associated with the "INFORMATION_DOCUMENT" encoded with a string "workflow_information.html"; and a value attribute associated with the "INFORMATION_RULE" encoded with a string "1." The server 12 then accesses the rules code page found at the location indicated by the string (i.e., workflow_information.html) encoded in the value attribute corresponding to the "INFORMATION_DOCUMENT" implementation detail identifier in the workflow identifier definition portion 60(1). In this example, a portion of the rules page includes the following information:

At step 160, the server 12 searches the rules code page (i.e., "workflow_information.html") for a "Rule_ID" string associated with the string "1." In this example, the server 12 finds the "Rule_ID-1" strings or rule identifiers encoded in the name attributes shown above and extracts the implementation detail identifier from each. The server 12 stores each implementation detail identifier parsed from each name attribute along with its corresponding value attribute in server memory 22. In this example, the server 12 determines that the rules page (i.e., "workflow_information.html") has: a value attribute (e.g., "value=" . . . "") associated with the "SOURCE_PAGE_IDENTIFIER" encoded with a string "source_page.html"; a value attribute associated with the "CONTENT_TYPE_IDENTIFIER" encoded with a string "Customers"; a value attribute associated with the "DESTINATION_IDENTIFIER1" encoded with a string "THISPAGE"; a value attribute associated with the "OPERATION_IDENTIFIER" encoded with a string "Copy"; a value attribute associated with the "LOCATION_IDENTIFIER1" encoded with a string "1100"; and a value attribute associated with the "POSITION_IDENTIFIER1" encoded with a string "after." The remainder of step 160 and steps 170-190 are performed in the same manner described above.

Further in this example and referring to FIG. 13, the user at computer 14(1) may view, modify and/or add rule implementation details defined in a rules page 100 (i.e., "workflow_information.html") by selecting a display-rules-button (not illustrated) included in one or more of the group-editable web pages 40(1)-40(2), 90(1)-90(2) and 100. In response, the server 12 sends the computer 14(1) the rules page 100 and the computer displays the page 100. The rules page 100 is based on the rules code page described above, and includes standard HTML formatting (not shown) for enabling the rule implementation details to be presented as the rows of rule information 102(1)-102(2) shown in FIG. 13, although other formatting languages may be used.

```
:
<input type="hidden" name="Rule_ID-1-SOURCE_PAGE_IDENTIFIER"
value="source_page.html">
<input type="hidden" name="Rule_ID-1-CONTENT_TYPE_IDENTIFIER" value="Customers">
<input type="hidden" name="Rule_ID-1-DESTINATION_IDENTIFIER1" value="THISPAGE">
<input type="hidden" name="Rule_ID-1-OPERATION_IDENTIFIER" value="Copy">
<input type="hidden" name="Rule_ID-1-LOCATION_IDENTIFIER1" value="1100">
<input type="hidden" name="Rule_ID-1-POSITION_IDENTIFIER1" value="after">
<input type="hidden" name="Rule_ID-2-SOURCE_PAGE_IDENTIFIER"
value="source_page.html">
<input type="hidden" name="Rule_ID-2-CONTENT_TYPE_IDENTIFIER" value="Customers">
<input type="hidden" name="Rule_ID-2-DESTINATION_IDENTIFIER1"
value="flexibleproject_calif.html">
<input type="hidden" name="Rule_ID-2-OPERATION_IDENTIFIER" value="Copy">
<input type="hidden" name="Rule_ID-2-LOCATION_IDENTIFIER1" value="1072">
<input type="hidden" name="Rule_ID-2-POSITION_IDENTIFIER1" value="before">
:
```

The rules page 100 enables the rule implementation details to be presented in a readable format enabling the user to easily discern, add and/or modify the rule implementation details. Further, the rules web page 100 includes rule-edit buttons 104(1)-104(2) and a rule-add-button 106. The user may select either of the rule-edit buttons 104(1)-104(2) and rule-add-button 106 to edit and/or add new rows of rule information using the template editing interfaces disclosed in the '912 application as modified for allowing the rules to be edited and using standard user interface techniques for obtaining user input for each of the implementation details. This allows users to easily modify or customize the implementation details to meet changing needs while the group-editable web pages remain accessible to users for content operations.

The operation of the system 10 for copying all of the contents of group-editable web page 40(1) to create a new group-editable page (not illustrated) in accordance with another embodiment of the present invention will now be described with reference to FIGS. 4-12. Steps 100-150 are performed in the same manner described above in connection with one or more embodiments of the present invention, except as described herein. In this example and referring back to FIG. 5, at step 100 the user at computer 14(1) desires copying the entire group-editable web page 40(1) to another location and selects the copy-entire-page button 50 instead of the copy-customer-item-button 43(3), although the user may desire copying selected portions of the page 40(1) and/or modifying the page 40(1) during the copy process, such as by removing editing buttons to produce a read-only version of the new group-editable page, or copying the entire group-editable web page 40(1) as described herein upon particular events occurring, such as each time the page 40(1) is modified.

At step 120 and referring to FIG. 6D, the browser operating on the computer 14(1) sends all pages copy workflow information 86 encoded in the "name=" attribute of the copy entire page button input tag 74 to the server 12. Step 130 is performed as described above, except just the workflow identifier (e.g., SparrowWorkflow) and the workflow information identifier (e.g., "10") are parsed from the copy entire page workflow information 86. At step 140, the server 12 determines that the name attribute in each input tag in the workflow identifier definition portion 60(4) has a workflow information identifier value of "10."

At step 150, the server 12 parses an implementation detail identifier (e.g., "OPERATION_IDENTIFIER," "DESTINATION_IDENTIFIER1," and "OVERWRITE_ALLOWED_IDENTIFIER") from each name attribute in the workflow identifier definition portion 60(4) and stores each identifier along with its corresponding value attribute in server memory 22. For example, the server 12 determines that the workflow identifier definition portion 60(4) has: a value attribute (e.g., "value=" . . . ") associated with the "OPERATION_IDENTIFIER" string encoded with a string "Exact Copy"; a value attribute associated with the "DESTINATION_IDENTIFIER1" string encoded with a string "copy_destination_page.html"; and a value attribute associated with the "OVERWRITE_ALLOWED_IDENTIFIER" string encoded with a string "True."

The server 12 determines that the content operation in this example is a "copy page" operation since the value attribute associated with the "OPERATION_IDENTIFIER" in the workflow identifier definition portion 60(4) is encoded with the string "Exact Copy" as mentioned above, although the string could be "Read Only Copy." The server 12 determines the contents of the page 40(1) should be copied to a file or page located at "copy_destination_page.html" based on the name attribute "DESTINATION_IDENTIFIER1" in the workflow identifier definition portion 60(4) and that the page should be overwritten with the page 40(1) contents being copied based on the "OVERWRITE_ALLOWED_IDENTIFIER" string encoded in the name attribute in the workflow identifier definition portion 60(4) being associated with the string "Exact Copy" encoded in the corresponding value attribute, although different locations may be associated with the "DESTINATION_IDENTIFIER 1" and the "OVERWRITE_ALLOWED_IDENTIFIER" string may be associated with a "False" string encoded in the corresponding value attribute where copying the contents of page 40(1) should only proceed if there are no contents already in the file identified by the "DESTINATION_IDENTIFIER1."

In this example, steps 160-180 do not need to be performed and step 190 is performed as described above, except here the server 12 makes an exact copy of the page code 41(1) (FIGS. 6A-6D) and stores it at the location specified by the "DESTINATION_IDENTIFIER1," which again in this example is "copy_destinaon_page.html" regardless of whether any content items are already present since the "OVERWRITE_ALLOWED_IDENTIFIER" string is associated with a "True" string encoded in the value attribute in the workflow identifier definition portion 60(4).

The embodiments of the present invention provide systems and methods for performing content operations, such as copying, moving, replacing and deleting content in group-editable web pages. For instance, content can be copied from a first group-editable web page(s) to at least one other group-editable web page where the copied content is formatted based on existing formatting information in the web page(s) where the content is being copied, moved or replaced. The system uses HTML comments in the group-editable pages without requiring the use of custom software programs for including explicit identifiers for source or destination group-editable pages. Embodiments of the present invention use workflow information identifiers to identify workflow implementation details, such as an identifier for the destination page (e.g., a URL), although the workflow implementation details may be stored in an external file. Furthermore, the embodiments of the present invention uses standard web browser interfaces, HTML files in a file system or in a web-accessible document repository, and software that copies content from one page to at least one other.

It should be appreciated that while exemplary embodiments of the present invention are described in relation to HTML and web pages, for example, the systems and methods of this invention can be applied to any electronic document or computer language comprising identifiable portions that can be selected for editing and/or content manipulation, such as the HTML family of languages and XML, and which have the capability of having textual comments included in the source that are invisible to the reader of the document, the ability to send form data to a server, and the ability to display selectable or clickable button icons. Further, the group-editable web pages 40(1)-40(2), 90(1)-90(2) and 100 can be used for a variety of purposes, such as for advertising, homework assignments, personnel directories (e.g., students, faculty), sortable "to do" lists, meeting schedulers, event loggers, speech announcements, project management, URL sharing, co-authoring documents, requesting comments, preparing and managing sign-up sheets, weighted voting, or a group home page, for example.

While particular embodiments have been described, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefor, is not intended to limit the claimed processes to any order except as may be specified in the claims.

What is claimed is:

1. A method for editing electronic documents comprising:
   storing in a server a source code page of a first document, the source code page comprising a plurality of template portions associated with a plurality of content items;
   receiving a request from a user to perform an operation on a content item in the first document;
   obtaining in response to the request workflow information corresponding to the operation to be performed including a content item identifier and a workflow identifier for the content item from a first template portion within the source code page associated with the first document, wherein the obtaining comprises:
      searching the source code page for information related to a definition of the workflow identifier stored in a second template portion of the source code page, the information related to the definition including information related to the operation to be performed and information related to a location indentifying where the content item is to be placed within a second document, which is an updated version of the first document, after the operation is performed;
   performing the operation involving the content item based upon the obtained workflow information, wherein the source code page is updated to reflect the performed operation,
   wherein performing the operation comprises carrying out at least one of copying, moving, deleting, and replacing the content item;
   storing the second document with an updated source code page in the server; and
   presenting the second document to the user in response to the request.

2. The method as set forth in claim 1 wherein performing the operation further comprises copying or moving the content item to a location in the first or second documents.

3. The method as set forth in claim 1 wherein the workflow information indicates where to place at least one content item with respect to at least one existing content item in the first or second documents.

4. The method as set forth in claim 1 wherein the workflow information identifies a content type of the content item.

5. The method as set forth in claim 1 wherein the workflow information identifies a template to use for formatting the content item.

6. The method as set forth in claim 1 further comprising scheduling when the operation is performed or performing the operation upon at least one event occurring.

7. The method as set forth in claim 1 further comprising providing at least one user interface for receiving the workflow information or enabling the workflow information to be modified.

8. The method as set forth in claim 1 wherein the obtaining and the performing are initiated in response to at least one user action via at least one user interface.

9. The method as set forth in claim 8 wherein the at least one user action comprises at least one selection of the user interface, the user interface comprising a selectable link or selectable icon that is associated with the workflow information.

10. The method as set forth in claim 8 wherein substantially all of at least one portion of the content item is selected as a result of the at least one user action.

11. The method as set forth in claim 1 wherein the content item comprises a plurality of the content items which are related to each other based on content type.

12. The method as set forth in claim 1 wherein the first and second documents comprise structured group-editable web pages.

13. The method as set forth in claim 1, wherein the workflow information is received in an encoded form as a part of the request from the user.

14. A computer-readable medium having stored thereon instructions for editing electronic documents, which when executed by at least one processor, causes the processor to perform steps comprising:
   storing in a server a source code page of a first document, the source code page comprising a plurality of template portions associated with a plurality of content items;
   receiving a request from a user to perform an operation on a content item in the first document;
   obtaining in response to the request workflow information corresponding to the operation to be performed including a content item identifier and a workflow identifier for the content item from a first template portion within the source code page associated with the first document, wherein the obtaining comprises:
      searching the source code page for information related to a definition of the workflow identifier stored in a second template portion of the source code page, the information related to the definition including information related to the operation to be performed and information related to a location indentifying where the content item is to be placed within a second document, which is an updated version of the first document, after the operation is performed;
   performing the operation involving the content item based upon the obtained workflow information, wherein the source code page is updated to reflect the performed operation,
   wherein performing the operation comprises carrying out at least one of copying, moving, deleting, and replacing the content item;
   storing the second document with an updated source code page in the server; and
   presenting the second document to the user in response to the request.

15. The medium as set forth in claim 14 wherein performing the operation further comprises copying or moving the content item to a location in the first or second documents.

16. The medium as set forth in claim 14 wherein the workflow information indicates where to place at least one content item with respect to at least one existing content item in the first or second documents.

17. The medium as set forth in claim 14 wherein the workflow information identifies a content type of the content item.

18. The medium as set forth in claim 14 wherein the workflow information identifies a template to use for formatting the content item.

19. The medium as set forth in claim 14 further comprising scheduling when the operation is performed or performing the operation upon at least one event occurring.

20. The medium as set forth in claim 14 further comprising providing at least one user interface for receiving the workflow information or enabling the workflow information to be modified.

21. The medium as set forth in claim 14 wherein the obtaining and performing are initiated in response to at least one user action via at least one user interface.

22. The medium as set forth in claim 21 wherein the at least one user action comprises at least one selection of the user interface, the user interface comprising a selectable link or selectable icon that is associated with the workflow information.

23. The medium as set forth in claim 21 wherein substantially all of at least one portion of the content item is selected as a result of the at least one user action.

24. The medium as set forth in claim 14 wherein the content item comprises a plurality of the content items which are related to each other based on content type.

25. The medium as set forth in claim 14 wherein the first and second documents comprise structured group-editable web pages.

26. The medium as set forth in claim 14, wherein the workflow information is received in an encoded form as a part of the request from the user.

27. A program storage device configured to edit electronic documents comprising:
 a server with memory, the server configured to:
  store in the memory a source code page of a first document, the source code page comprising a plurality of template portions associated with a plurality of content items, and
  receive a request from a user to perform an operation on a content item in the first document;
 an information retrieval system in the server that obtains in response to the request workflow information corresponding to the operation to be performed including a content item identifier and a workflow identifier for the content item from a first template portion within the source code page associated with the first document, wherein the information retrieval system is configured to:
  search the source code page for information related to a definition of the workflow identifier stored in a second template portion of the source code page, the information related to the definition including information related to the operation to be performed and information related to a location indentifying where the content item is to be placed within a second document, which is an updated version of the first document, after the operation is performed;
 a content operation system in the server that performs the operation involving the content item based upon the obtained workflow information, wherein the content operation system updates the source code page to reflect the performed operation and wherein the workflow identifier is configured to identify the content operation,
  wherein the content operation system is configured to carry out at least one of copying, moving, deleting, and replacing the content item, wherein the second document with an updated source code page is stored in the memory of the server; and
 a display unit configured to present the second document to the user in response to the request.

28. The device as set forth in claim 27 wherein the operation system copies or moves the content item to a location in the first or second documents.

29. The device as set forth in claim 27 wherein the workflow information indicates where to place at least one content item with respect to at least one existing content item in the first or second documents.

30. The device as set forth in claim 27 wherein the workflow information identifies a content type of the content item.

31. The device as set forth in claim 27 wherein the workflow information identifies a template to use for formatting the content item.

32. The device as set forth in claim 27 wherein the content operation system schedules when the operation is performed or performs the operation upon at least one event occurring.

33. The device as set forth in claim 27 further comprising an interface system that provides at least one user interface for receiving the workflow information or enabling the workflow information to be modified.

34. The device as set forth in claim 27 further comprising a user input system that accepts at least one user action for initiating actions carried out by the information retrieval system and the content operation system.

35. The device as set forth in claim 34 wherein the at least one user action comprises at least one selection of the user interface, the user interface comprising a selectable link or selectable icon that is associated with the workflow information.

36. The device as set forth in claim 34 wherein substantially all of at least one portion of the content item is selected as a result of the at least one user action.

37. The device as set forth in claim 27 wherein the content item comprises a plurality of the content items which are related to each other based on content type.

38. The device as set forth in claim 27 wherein the first and second documents comprise structured group-editable web pages.

39. The device as set forth in claim 27, wherein the workflow information is received in an encoded form as a part of the request from the user.

* * * * *